United States Patent [19]

Fujimaki et al.

[11] 4,451,590

[45] * May 29, 1984

[54] ORGANIC FRICTION MATERIAL

[75] Inventors: Hiroto Fujimaki, Kokubunji; Shigetoshi Ajima; Kazuhiro Watanabe, both of Iwaki, all of Japan

[73] Assignee: Kureha Kagaku Kogyo Kabushiki Kaisha, Tokyo, Japan

[*] Notice: The portion of the term of this patent subsequent to May 31, 2000 has been disclaimed.

[21] Appl. No.: 477,486

[22] Filed: Mar. 21, 1983

Related U.S. Application Data

[63] Continuation of Ser. No. 382,729, May 27, 1982, Pat. No. 4,386,168.

[30] Foreign Application Priority Data

Jun. 10, 1981 [JP] Japan ................... 56-89032

[51] Int. Cl.$^3$ ................... C08K 3/08; C08K 3/04
[52] U.S. Cl. ................... 523/155; 523/156; 524/496; 524/440
[58] Field of Search ................ 523/155, 156; 524/496

[56] References Cited

U.S. PATENT DOCUMENTS

| | | | |
|---|---|---|---|
| 4,051,097 | 9/1977 | Aldrich | 523/155 |
| 4,348,490 | 9/1982 | Ogiwara | 524/496 |
| 4,386,168 | 5/1983 | Fujimaki et al. | 523/155 |

FOREIGN PATENT DOCUMENTS

| | | | |
|---|---|---|---|
| 51-65161 | 6/1976 | Japan | 524/496 |
| 51-65164 | 6/1976 | Japan | 524/496 |
| 1387232 | 3/1975 | United Kingdom . | |
| 2016027 | 9/1979 | United Kingdom. | |
| 2047722 | 12/1980 | United Kingdom . | |

Primary Examiner—Lewis T. Jacobs
Attorney, Agent, or Firm—Oblon, Fisher, Spivak, McClelland & Maier

[57] ABSTRACT

Disclosed herein is an organic friction material comprising 5 to 25% by volume of metallic fiber, 3 to 40% by volume of activated carbon, 3 to 15% by volume of carbon fiber, 7 to 47% by volume of an organic and inorganic filling material and 10 to 30% by volume of phenolic resin.

5 Claims, No Drawings

ORGANIC FRICTION MATERIAL

This is a continuation of application Ser. No. 382,729, filed May 27, 1982, now U.S. Pat. No. 4,386,168, issued May 31, 1983.

BACKGROUND OF THE INVENTION

1. Field of the Invention

The present invention relates to an organic friction material for use in brake shoe and clutch plate of motor vehicles and brake shoe in railway rolling stocks of which the binding material is a resin.

2. Description of the Prior Art

Hitherto, the leading fraction of the organic friction material has been the so-called asbestos-based organic friction material consisting of chrysotile asbestos (hereinafter referred to simply as asbestos) as the reinforcing base material and phenolic resin as the binding material added with various friction-controlling agents.

However, although asbestos has various excellent specific properties, the harmfulness of asbestos dust to human bodies has been recently pointed out and the use of asbestos has come to be restricted from the viewpoint of environmental problems.

On the other hand, as the transport facilities such as motor vehicles and electric cars become to travel at a high speed recently, the demanded properties for better braking materials are greater. Particularly, it is demanded that braking effectiveness is excellent and stabilized even under the severe conditions from the viewpoint of safety, and that the braking materials should be longer lasting from the viewpoint of maintenance. Various materials have been proposed for responding these demands.

For instance, a number of the so-called semi-metallic friction materials comprising a metal as base material and phenolic resin as binding material have been developed (U.S. Pat. No. 3,434,998 and U.S. Pat. No. 3,835,118). These semi-metallic friction materials comprise metal or metal oxide as the base material and phenolic resin as the binding material, and generally graphite is used abundantly as the friction adjusting material. Owing to its lubricating specificity, graphite reduces the friction coefficient a little, however, it is said that graphite has a function of suppressing the noise generated at the time of braking and a function of improving the wear resistance.

On the other hand, British Patent 1,387,232 discloses the solution of the problem of low friction coefficient of graphite by substituting carbon in non-graphite form for graphite.

As the result of studying the function of carbon or graphite in such semi-metallic friction materials, the present inventors have confirmed the effect of carbon fibers added to the friction material, and have obtained U.S. Pat. No. 4,278,584. The present inventors have continued the study and have confirmed the effect of the coexistence of carbon fibers and activated carbon in the friction material, and have attained the present invention.

SUMMARY OF THE INVENTION

The present invention relates to an organic friction material having a fiberform metal as the base material and a phenol resin as the binding material, into which a specified carbon material has been filled up, thereby having an excellent friction performance.

It is an object of the present invention to provide a friction material without using asbestos. Another object of the present invention is to provide a friction material having a stable friction coefficient and excellent in anti-fading property (fading property means the phenomenon of reduction of the friction coefficient due to the heat generated at the time of braking) and excellent wear resistance.

Having now briefly described the invention, a more complete understanding can be obtained by reference to the description of the preferred embodiments which is provided herein for purposes of illustration only, and are not intended to be limiting unless otherwise specified.

DESCRIPTION OF THE PREFERRED EMBODIMENTS

The composition of the organic friction material according to the present invention comprises 5 to 25% by volume of metallic fibers, 3 to 40% by volume of particles of activated carbon, 3 to 15% by volume of carbon fibers, 7 to 47% by volume of an organic or inorganic filling material and 10 to 30% by volume of phenolic resin to total volume of the ingredients.

The particles of activated carbon in the present invention means the particles of activated carbon having a specific surface area of more than 200 $m^2/g$ and a large number of micropores. Usually, they are heat-treated at a temperature of 700° to 1,000° C. in the course of their production. The specific surface area is preferably 500 to 2,000 $m^2/g$.

The average diameter of the particles of activated carbon is usually 50 to 1,000 microns, and preferably 150 to 500 microns. The content of the particles of activated carbon in the friction material is suitably 3 to 40% by volume, and in the case of more than 40% by volume, it is difficult to fabricate the friction material, and on the other hand, the smallest amount necessary for exhibiting their specific property is 3% by volume.

The fiberform metal is a wooly fiber prepared by cutting steel, stainless steel, brass and the like or fiber prepared by melt-extruding one of these metals of 0.1 to 10 mm in length and 5 to 1,000 microns in diameter. It is important that the content of the firberform metal is at least 5% by volume, however, on the other hand, in the case of more than 25% by volume, it is difficult to fabricate the friction material and the thus obtained friction material is practically unsuitable because the product is too heavy.

The carbon fiber is not restricted by its precursor, and the fiber of 5 to 50 microns in diameter and of longer than 0.1 mm in length is usually used in the preferable amount of 3 to 15% by volume. The carbon fiber is a carbon material particularly useful in improving the wear resistance and mechanical property of the product in the case of coexistence with the particles of activated carbon.

As the organic or inorganic filling material, known substance can be used, for instance, an organic substance such as cashew-dust, rubber-dust, or an inorganic compound such as graphite, barium sulfate, calcium carbonate, metal and the like. Fibrous substance is also preferable as such a filling material, for instance, fiber of aromatic amide derivative which is excellent in thermal resistance is particularly preferable filling material for improving of mechanical property of the product.

As has been described above, the present invention provides a semi-metallic friction material having a stable friction coefficient, excellent anti-fading property and excellent wear resistance by using particles of activated carbon of large specific surface area and carbon fibers as the friction modifier. In addition, it has been pointed out that the high thermal conductivity of the conventional semi-metallic friction material easily transfer the generated friction heat to the system of brake oil to excessively heat the brake oil thus frequently causing vapour lock. However, it has been found out by the present inventors that the thermal conductivity of the friction material according to the present invention is possibly reduced to the same extent as in the conventional asbestos friction material by filling the material with the particles of activated carbon and carbon fibers. The thus reasonably adjusted thermal conductivity obtained as an unexpected result is a very important property of the organic friction material in actual use.

Having generally described the invention, a more complete understanding can be obtained by reference to the Examples which are provided herein for purposes of illustration only, and are not intended to be limiting unless otherwise specified.

EXAMPLES 1 AND 2 AND COMPARATIVE EXAMPLES 1 AND 2

The respective materials shown in Table 1 were blended together with in a Henschel mixer to be a uniformly dispersed mixture, and the thus obtained mixture was compression-molded at 170° C. under a pressure of 200 kg/cm² while using a metal mold. The thus obtained materials were subjected to hardening treatment at 180° C. for 4 hours to be friction material.

From each of the thus obtained friction materials, two pieces of specimen of 25×25×6 (thickness) mm in dimensions were cut out, and they were evaluated by a friction tester of constant speed type according to Japanese Industrial Standards (JIS) D-4411 by an intermittent method according to Japanese Automobile Standards Organization (JASO) C-418, under the conditions of sliding speed of 10 m/sec, pressure on the surface of 20 kg/cm², the intermittent cycle of 5 sec with pressure and 5 sec without pressure. The temperature of the counter part (surface) continuously raised from room temperature up to 350° C., so-called fading test.

The conditions of this test of sliding speed of 10 m/sec and pressure on the surface of 20 kg/cm² are fairly severe as compared to the ordinary conditions of 5 to 8 m/sec and 13 kg/cm².

On the other hand, isothermal wear test was carried out while according to the method in Japanese Automobile Standards Organization (JASO) C-418 under the conditions of a sliding speed of 5 m/sec, pressure on the surface of 20 kg/cm² (2 MN/m²) with an intermittent cycle of 3.5 sec with pressure and 5 sec without pressure and with the temperature of the counter part of 100° and 200° C., the number of friction being 100.

The wear rate was calculated from the length of wear and the average friction coefficient.

The minimum value of the friction coefficient ($\mu_{min}$), and the wear rate in the isothermal wear tests at 100° and 200° C. are shown in Table 2 together with the test results of a commercialized product of friction material.

TABLE 1

Composition of the friction material unit: % by volume

| Classification | Phenol resin | Steel wool | Activated carbon* | Carbon fiber | Inorganic filler* | Organic filler**** |
|---|---|---|---|---|---|---|
| Example 1 | 20 | 15 | 20 | 9 | 21 | 15 |
| Example 2 | 20 | 25 | 5***** | 5 | 30 | 15 |
| Comparative Example 1 | 20 | 25 | 5 | 0 | 35 | 15 |
| Comparative Example 2 | 20 | 25 | 0 | 5 | 35 | 15 |

Notes:
*Specific surface area: 1600 m²/g Average diameter: 400 microns Made by Kureha Chem. Ind. Co., Ltd. (Beads) Active Carbon)
**Average diameter: 18 microns Average length: 0.7 mm Made by Kureha Chem. Ind. Co., Ltd.
***Composed at least 50% by volume of graphite.
****Cashew-dust (made by Cashew Co. Ltd.)
*****Prepared by pulverizing the activated carbon and sifting the pulverized powder with the meshes of ASTM standards No. 40 and No. 200. (Sieve opening range of 74 to 420 microns).

TABLE 2

| Specimen (prepared in) | $\mu_{min}$ | Results of Fade Test Wear rate ($10^{-7}$ cm³/kg · m) | |
|---|---|---|---|
| | | 100° C. | 200° C. |
| Example 1 | 0.31 | 0.95 | 0.83 |
| Example 2 | 0.32 | 0.93 | 0.95 |
| Comparative Example 1 | 0.32 | 1.15 | 1.20 |
| Comparative Example 2 | 0.29 | 0.98 | 1.01 |
| Commercial friction material | | | |
| Asbestos based | 0.29 | 2.06 | 3.40 |
| Semi-metallic | 0.30 | 1.43 | 1.32 |

As are clearly seen in Table 2, the friction material according to the present invention shows a lower value of wear rate and a little higher $\mu_{min}$ as compared to the Comparative example and commercial friction materials, namely, superior in anti-fading property and wear resistance to the thus compared friction materials.

In the next place, thermal conductivity and mechanical properties of these specimens were determined.

Thermal conductivity was determined by a Shibayama-type apparatus for determining thermal conductivity Model SS-TC-18b at steady state.

As the mechanical property, flexual strength was determined according to the method in ASTM-D-790. The results are shown in Table 3.

TABLE 3

Physical properties of the friction material

| Specimen (obtained in) | Apparent density (g/cm³) | Flexual strength (kg/cm²) | ((MPa)) | Thermal conductivity (kcal/m hour° C.) | ((W/m° C.)) |
|---|---|---|---|---|---|
| Example 1 | 2.21 | 405 | (40.5) | 0.42 | (0.49) |
| Example 2 | 2.35 | 410 | (41.0) | 0.85 | (0.99) |
| Comparative | 2.43 | 350 | (35.0) | 0.93 | (1.08) |

TABLE 3-continued

| Specimen (obtained in) | Physical properties of the friction material | | | | |
| --- | --- | --- | --- | --- | --- |
| | Apparent density (g/cm³) | Flexual strength | | Thermal conductivity | |
| | | (kg/cm²) | ((MPa)) | (kcal/m hour° C.) | ((W/m° C.)) |
| Example 1 Comparative Example 2 | 2.36 | 410 | (41.0) | 0.91 | (1.06) |
| Commercialized friction material | | | | | |
| Asbestos based | 2.20 | — | | 0.45 | (0.52) |
| Semi-metallic | 3.53 | — | | 5.11 | (5.94) |

As are clearly seen in Table 3, according to the present invention, a friction material showing a thermal conductivity comparable to that of a commercial friction material made of asbestos is possibly obtained.

On the other hand, a commercial semi-metallic friction material shows a very thermal conductivity and it is necessary to use a thermal insulation layer in the practical use.

As has been shown above, the friction material according to the present invention is excellent in the wear resistance and friction property, and excellent in the view point of thermal conductivity and mechanical strength.

Having now fully described the invention, it will be apparent to one of ordinary skill in the art that many changes and modifications can be made thereto, without departing from the spirit or scope of the invention as set forth therein.

What is claimed is:

1. An organic friction material comprising 5 to 25% by volume of metal fiber, 3 to 40% by volume of activated carbon, 3 to 15% by volume of carbon fiber, 7 to 47% by volume of an organic and inorganic filling material and 10 to 30% by volume of phenolic resin.

2. An organic friction material according to claim 1, wherein said metal fiber is steel fiber or stainless steel fiber.

3. An organic friction material according to claim 1, wherein said activated carbon has a specific surface area of more than 200 m²/g.

4. An organic friction material according to claim 1, wherein said activated carbon has a specific surface area in a range of 500 to 2,000 m²/g and a particle diameter in the range of 50 to 1,000 microns.

5. An organic friction material according to claim 1, wherein said carbon fiber is longer than 0.1 mm in fiber average length and has an average diameter in the range of 5 to 50 microns.

* * * * *